US012801318B2

(12) United States Patent
Liu et al.

(10) Patent No.: US 12,801,318 B2
(45) Date of Patent: Nov. 17, 2026

(54) SYSTEM FOR REPRINTING PAGES WITH PRINT ERRORS

(71) Applicant: FUJIFILM BUSINESS INNOVATION CORP., Tokyo (JP)

(72) Inventors: Bo Liu, Kanagawa (JP); Kimihiko Sasaki, Kanagawa (JP); Mari Kodama, Kanagawa (JP); Yuka Sugiyama, Kanagawa (JP); Yoshie Ohira, Kanagawa (JP); Naoto Yamasaki, Kanagawa (JP); Kazuki Nagashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/179,591

(22) Filed: Mar. 7, 2023

(65) Prior Publication Data

US 2024/0103783 A1 Mar. 28, 2024

(30) Foreign Application Priority Data

Sep. 26, 2022 (JP) ................................ 2022-152381

(51) Int. Cl.
*G06F 3/12* (2006.01)

(52) U.S. Cl.
CPC .......... *G06F 3/1234* (2013.01); *G06F 3/1219* (2013.01); *G06F 3/1241* (2013.01); *G06F 3/1284* (2013.01)

(58) Field of Classification Search
USPC ........................................................ 358/1.14
See application file for complete search history.

(56) References Cited

U.S. PATENT DOCUMENTS

2003/0231320 A1* 12/2003 Tsunekawa ........ G06K 15/1806 358/1.11
2011/0299862 A1 12/2011 Kozuka
2012/0257243 A1* 10/2012 Kai ......................... G06F 21/10 358/1.14
2017/0351466 A1* 12/2017 Mitsubori .......... H04N 1/00411

FOREIGN PATENT DOCUMENTS

JP 2009-202436 A 9/2009
JP 2011-177980 A 9/2011
JP 2012-011769 A 1/2012
JP 2021-030484 A 3/2021
JP 2021-066158 A 4/2021

OTHER PUBLICATIONS

Jul. 21, 2026 Office Action issued in Japanese Patent Application No. 2022-152381.

* cited by examiner

*Primary Examiner* — Jacky X Zheng
(74) *Attorney, Agent, or Firm* — Oliff PLC

(57) ABSTRACT

An image processing apparatus includes a processor configured to impose a group of pages on a single sheet as a target for reprinting and perform reprinting, the group of pages being referred to as printing-error pages, each of the pages having been printed with a printing error that occurred while multiple pages imposed on one or more sheets were printed.

16 Claims, 15 Drawing Sheets

SIDE-STITCH BOOK 100 (FRONT SURFACE)

| | | | |
|---|---|---|---|
| 1 | 4 | 5 | 8 |
| 9 | 12 | 13 | 16 |
| 17 | 20 | 21 | 24 |
| 25 | 28 | 29 | 32 |
| 33 | 36 | 37 | 40 |
| 41 | 44 | 45 | 48 |

100 (BACK SURFACE)

| | | | |
|---|---|---|---|
| 7 | 6 | 3 | 2 |
| 15 | 14 | 11 | 10 |
| 23 | 22 | 19 | 18 |
| 31 | 30 | 27 | 26 |
| 39 | 38 | 35 | 34 |
| 47 | 46 | 43 | 42 |

FIG. 12

102

FRONT

| | | | |
|---|---|---|---|
| 9 | 12 | 29 | 32 |
| 9 | 12 | 13 | 16 |
| 17 | 20 | 21 | 24 |
| 45 | 48 | | |
| | | | |
| | | | |

BACK

| | | | |
|---|---|---|---|
| 10 | 11 | 30 | 31 |
| 10 | 11 | 14 | 15 |
| 18 | 19 | 22 | 23 |
| 46 | 47 | | |
| | | | |
| | | | |

SYSTEM FOR REPRINTING PAGES WITH PRINT ERRORS

CROSS-REFERENCE TO RELATED APPLICATIONS

This application is based on and claims priority under 35 USC 119 from Japanese Patent Application No. 2022-152381 filed Sep. 26, 2022.

BACKGROUND

(i) Technical Field

The present disclosure relates to an image processing apparatus, an image processing method, and a non-transitory computer readable medium.

(ii) Related Art

Some printers are configured to print multiple pages imposed on a single sheet.

Japanese Unexamined Patent Application Publication No. 2021-30484 discloses an image processing apparatus configured to produce a printed sheet on which documents created by multiple jobs are imposed.

SUMMARY

A printing error (such as a stain) sometimes occurs on a printed page when multiple pages are imposed on a sheet and the multiple pages are printed. In such a case, all of the multiple pages may be reprinted. However, if all of the multiple pages are reprinted, one or more pages that are unrelated to the printing error are also reprinted, leading to waste of resources used for such unrelated pages.

Alternatively, each page containing one or more errors that occurred during printing may be reprinted on a separate sheet. In other words, each page with one or more printing errors may be reprinted on a separate sheet. However, if each page is reprinted on a separate sheet, the number of sheets required for reprinting is large because the reprinting requires as many sheets as the number of pages with one or more printing errors.

Aspects of non-limiting embodiments of the present disclosure relate to preventing pages unrelated to printing errors from being reprinted, the printing errors having occurred on printed pages while multiple pages imposed on a sheet were printed, and reducing the number of sheets required for printing, compared with printing, on a separate sheet, each page containing one or more errors that occurred during printing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to impose a group of pages on a single sheet as a target for reprinting and perform reprinting, the group of pages being referred to as printing-error pages, each of the pages having been printed with a printing error that occurred while a plurality of pages imposed on one or more sheets were printed.

BRIEF DESCRIPTION OF THE DRAWINGS

An exemplary embodiment of the present disclosure will be described in detail based on the following figures, wherein:

FIG. 12 is an example of a print job created when pages are imposed again after the printed sheets depicted in FIG. 11 are inspected;

DETAILED DESCRIPTION

Figure 1:
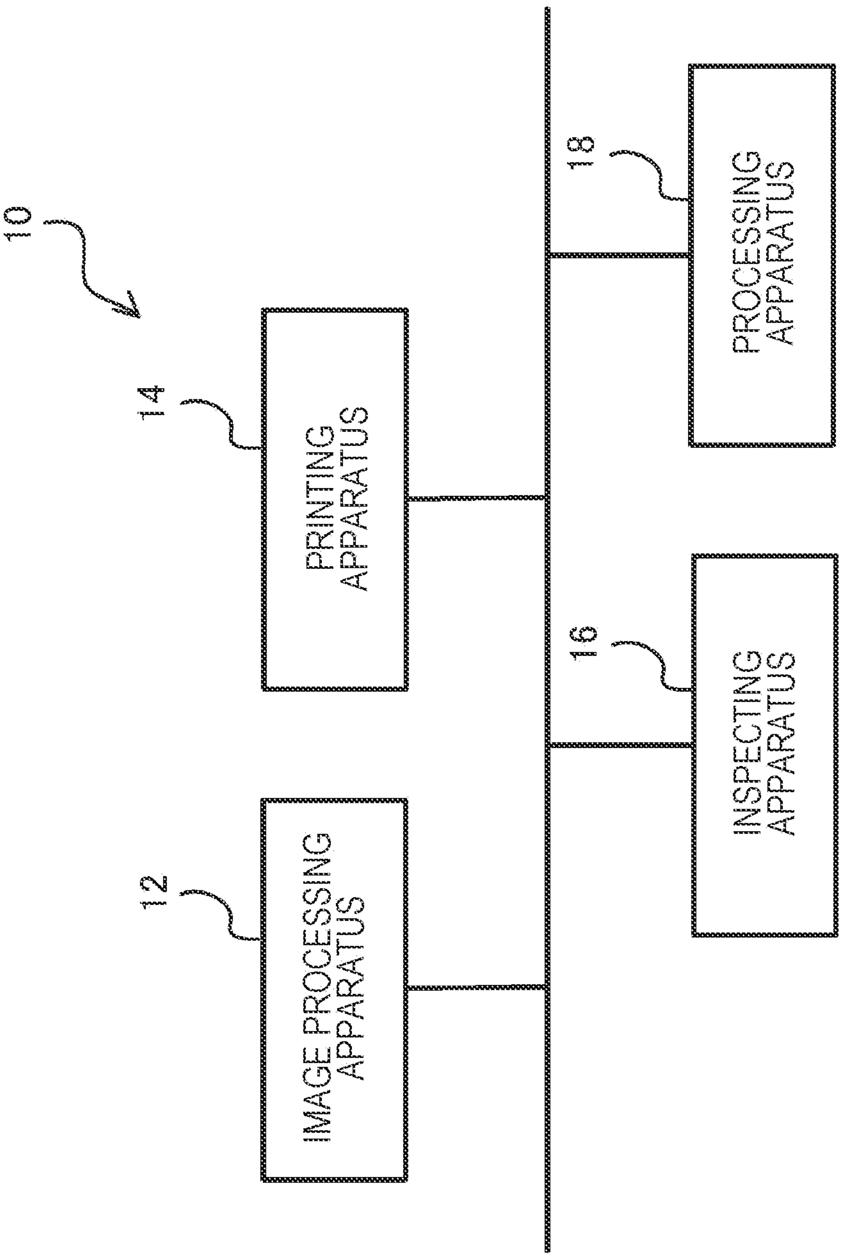
FIG. 1 is a block diagram depicting a configuration of an information processing system.

FIG. 1 is a block diagram depicting a configuration of an information processing system 10. The information processing system 10 is configured to impose and print multiple pages on a sheet. Imposing and printing multiple pages on a sheet produces a printed sheet as a result of printing. The information processing system 10 is configured to inspect and process the printed sheet. The information processing system 10 is also configured to impose again, on a sheet, one or more pages each identified in the inspection as a page that requires reprinting and produce a printed sheet.

The term "impose" means arranging multiple pages on a sheet when printed matter such as a booklet or a book is produced. In other words, the term "impose" means placing multiple pages in the order and at the positions in accordance with the methods of printing and bookbinding. Allocating (that is, placing) pages to a sheet in the data is referred to as "imposing" in the present specification. In contrast, printing pages on a sheet physically in accordance with the allocation (that is, imposition) is referred to as "printing imposed pages".

The information processing system 10 includes an image processing apparatus 12, a printing apparatus 14, an inspecting apparatus 16, and a processing apparatus 18. The image processing apparatus 12, the printing apparatus 14, the inspecting apparatus 16, and the processing apparatus 18 each have a function of communicating with the other apparatuses. For example, the image processing apparatus 12, the printing apparatus 14, the inspecting apparatus 16, and the processing apparatus 18 are configured to communicate with each other via a communication path such as the Internet or a local area network (LAN).

Examples of the image processing apparatus 12 include devices such as a personal computer (referred to as "PC" hereinafter) and a server.

The image processing apparatus 12 is configured to receive image data and create a print job. For example, information or data representing a print instruction or command corresponds to a "print job". The information (that is, print job) representing a print instruction includes information or data representing a printing condition. A print job may include image data to be subjected to printing. The image processing apparatus 12 is configured to send the created print job to the printing apparatus 14 and control printing.

Further, the image processing apparatus 12 is also configured to create a new print job when a printing error occurred and there is a page that requires reprinting. Specifically, the image processing apparatus 12 is configured to impose as a target for reprinting, on a single sheet, a group of pages having been printed with printing errors when the printing errors occurred.

The term "printing error" indicates an error with regard to printing on a sheet. Examples of printing errors include a printed sheet being crinkled, streaked, or stained with toner in addition to a printed letter or image being faint or blurred. A page printed with one or more printing errors is referred to as a "printing-error page" in the following description.

The term "impose pages on a single sheet" represents imposing printing-error pages on a single sheet and not on different sheets when multiple pages were each printed with one or more errors. The number of pages to be printed on a single sheet is set for the information processing system 10 disclosed in the present specification. The page size is also fixed, and printing and reprinting are performed in accordance with the page size. One or more pages that cannot be accommodated by a single sheet are printed on another sheet. Accordingly, since a single sheet cannot accommodate all the printing-error pages for too large a number of pages, the printing-error pages are sequentially imposed on multiple sheets, such as the first sheet, the second sheet, . . . . The term "impose pages on a single sheet" means imposing at least multiple printing-error pages on a single sheet in the present specification.

The printing apparatus 14 is configured to print, on a printing medium such as a sheet of paper, an image (including an image formed only by one or more characters and/or symbols) represented by image data for which a print request is made. Specific examples of the printing apparatus 14 include a printer, which has a printing function. The printing apparatus 14 may be a multifunction peripheral having multiple image output functions, such as a printing function, a scanning function, and a copying function.

The inspecting apparatus 16 is configured to inspect a printed sheet. For example, the inspecting apparatus 16 is configured to create image data by taking a picture of a printed sheet and identify the position at which an error occurred by analyzing the image data. The inspecting apparatus 16 is also configured to identify the position at which a printing error occurred on a sheet subjected to printing (that is, a printed sheet) and transmit the information representing the position to the image processing apparatus 12. For example, the inspecting apparatus 16 is configured to identify the coordinates of the location at which a printing error occurred on a sheet as the position at which a printing error occurred and transmit the information representing the coordinates to the image processing apparatus 12 (the coordinates being measured, for example, with respect to the position identified as the origin in advance).

The processing apparatus 18 is a post-processing handling apparatus configured to perform processing such as cutting a printed sheet.

Figure 2:
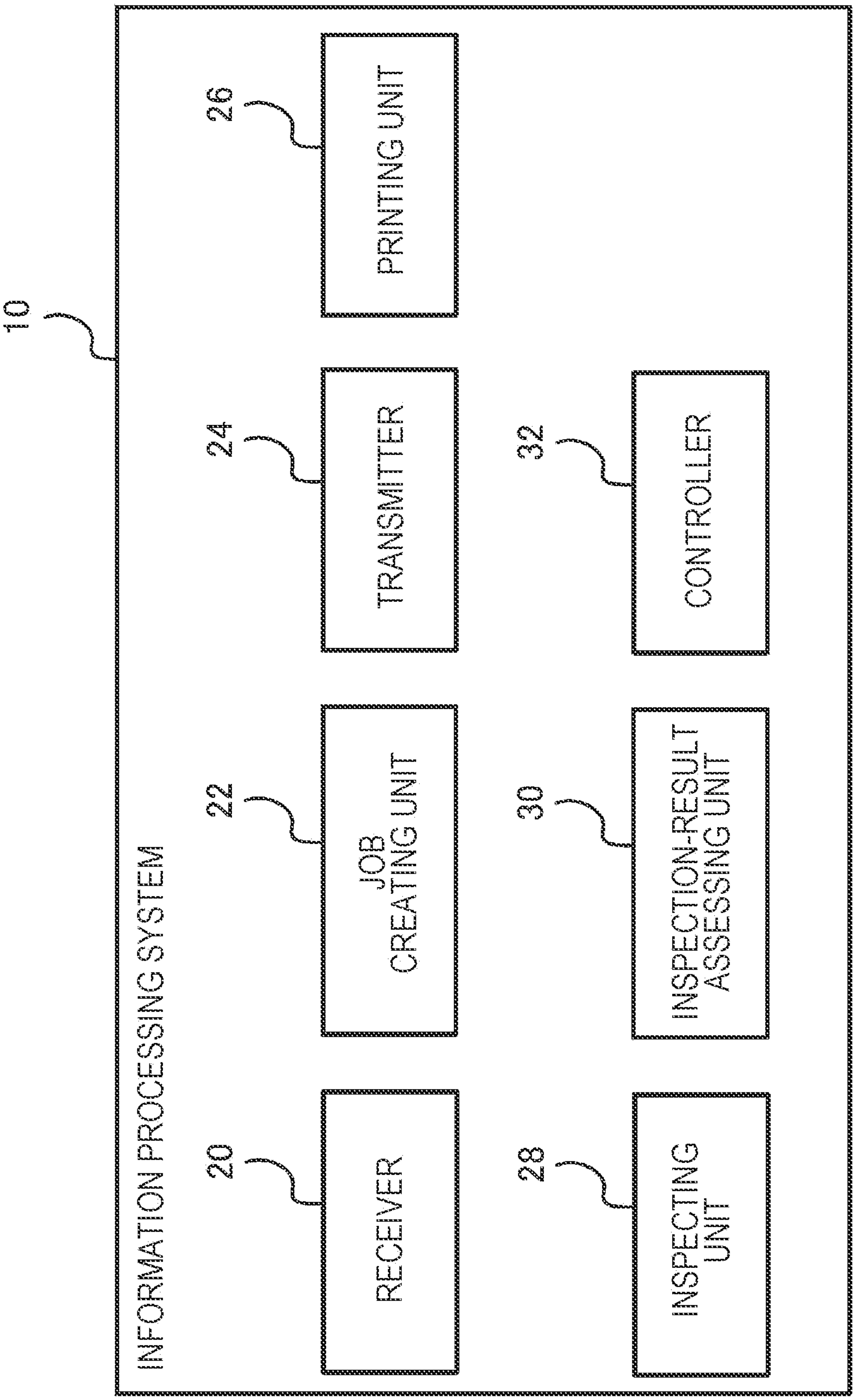
FIG. 2 is a functional block diagram of the information processing system.

Referring to FIG. 2, the information processing system 10 will further be described below. FIG. 2 depicts an example of a functional block diagram of the information processing system 10.

The information processing system 10 includes, for example, a receiver 20, a job creating unit 22, a transmitter 24, a printing unit 26, an inspecting unit 28, an inspection-result assessing unit 30, and a controller 32.

The receiver 20 is configured to receive image data and various kinds of data created in the information processing system 10.

The job creating unit 22 is configured to create a print job for printing data received by the receiver 20. Further, the job creating unit 22 is also configured to create a print job for reprinting when a printing error occurs.

When creating a print job for reprinting, the job creating unit 22 imposes a printing-error page and a page related to the printing-error page on a single sheet as a target for reprinting. The term "page related to the printing-error page" represents a page determined based on the method of bookbinding and the method of imposition. A page related to a printing-error page will be described below by using a specific example.

The transmitter 24 is configured to transmit various kinds of data. Transmission destinations of various kinds of data are the apparatuses in the information processing system 10 in the exemplary embodiment. Examples of the various kinds of data include a print job created by the job creating unit 22.

The printing unit 26 is configured to perform a created print job and obtain a printed sheet based on the print job.

The inspecting unit 28 is configured to perform inspection by analyzing the image of a printed sheet. Specifically, the inspecting unit 28 is configured to inspect a printed sheet to determine whether a printing error such as a stain occurred on the printed sheet. The inspecting unit 28 is also configured to identify the position of a printing error that occurred.

The inspection-result assessing unit 30 is configured to identify a printing-error page. A printing-error page is identified based on the position of an error identified by the inspecting unit 28 and the information that is included in a print job and that represents the position of each page placed on a sheet. More specifically, a print job created by the job creating unit 22 includes the information with regard to where on a sheet which page is placed (that is, imposed), which is the information representing the position of each page on a sheet. Thus, the inspection-result assessing unit 30 identifies a printing-error page based on the position of each page on a sheet and the position at which an error occurred. Specifically, the inspection-result assessing unit 30 identifies, as a printing-error page, a page placed in a region including the position at which an error occurred.

The inspection-result assessing unit 30 is also configured to determine based on the inspection performed by the inspecting unit 28 whether a page that requires reprinting is included. For example, even when a printing error occurs, the position or degree of the error may render reprinting unnecessary. Thus, the inspection-result assessing unit 30 determines whether reprinting is necessary before the job creating unit 22 creates a print job for reprinting. For example, the inspection-result assessing unit 30 determines that reprinting is necessary when the size of a stain or the number of stains on a sheet is equal to a threshold or larger. Further, the inspection-result assessing unit 30 is configured to identify one or more pages related to a printing-error page.

The controller 32 is configured to control the operation of each unit of the information processing system 10.

Figure 3:
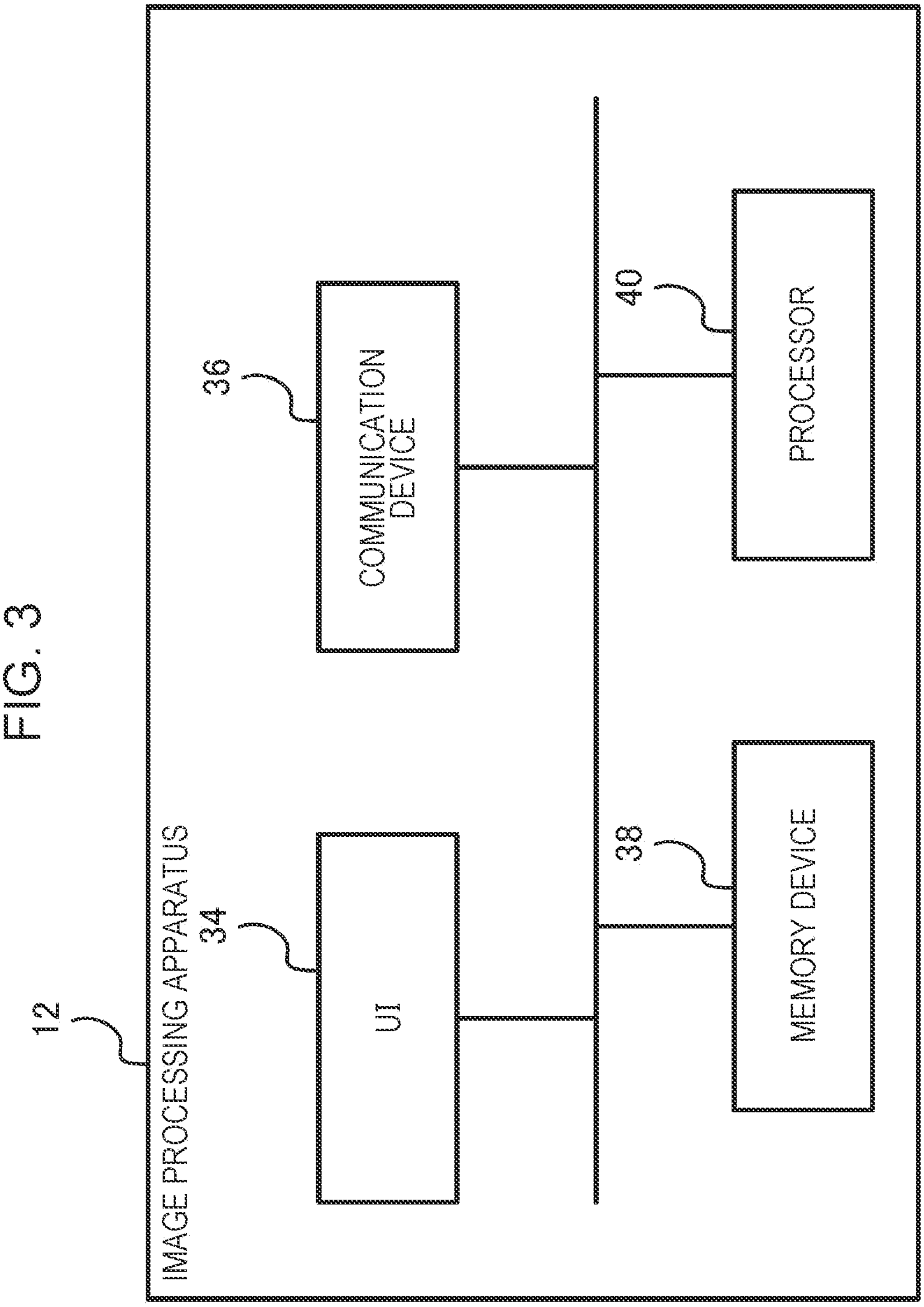
FIG. 3 is a block diagram depicting a hardware configuration of an image processing apparatus.

Referring to FIG. 3, a hardware configuration of the image processing apparatus 12 will be described below. FIG. 3 depicts an example of the hardware configuration of the image processing apparatus 12.

The image processing apparatus 12 includes a user interface (abbreviated to "UI" hereinafter) 34, a communication device 36, a memory device 38, and a processor 40.

The UI 34 is a user interface and includes a display and an input device. Examples of the display include a liquid crystal display and an electroluminescent (EL) display. Examples of the input device include a keyboard, a mouse, and an input key or an operation panel. The UI 34 may be a UI such as a touch panel, which combines a display and an input device.

The communication device 36 includes one or more communication interfaces including a communication chip, a communication circuit, and other components and has a function of transmitting information to other apparatuses and a function of receiving information from other apparatuses. The communication device 36 may have a wireless communication function, such as near field wireless communication or Wi-Fi (registered trademark), or a wireline communication function.

The memory device 38 is a device having one or more memory regions that store data. Examples of the memory device 38 include a hard disk drive (HDD), a solid-state drive (SSD), various kinds of memories (for example, a random-access memory (RAM), a dynamic RAM (DRAM), a non-volatile RAM (NVRAM), a read-only memory (ROM)), other storage devices (for example, an optical disc), and a combination of the above.

The processor 40 is configured to control the operation of each unit of the image processing apparatus 12.

The processor 40 is configured to create a print job, send the created print job to the printing apparatus 14, and control the printing apparatus 14 for printing. Specifically, the processor 40 is configured to receive image data to be subjected to printing via the communication device 36 and create a print job by imposing pages on a sheet in the data. For example, for each page, a print job includes the information representing the correspondence between the information representing the page (for example, the page number) and the information representing the position at which the page is placed on a sheet (for example, the coordinate information). The processor 40 is also configured to receive, via the communication device 36, the information representing the positions at which printing errors occurred on multiple pages printed based on the print job and identify each of the pages on which an error occurred. A page on which an error occurred is identified by the comparison between the information representing the position at which the printing error occurred and the positional information included in the print job. Specifically, the processor 40 is configured to identify the printing-error page based on the position of a page on a sheet included in the print job and the position at which an error occurred. The printing errors are each an error that occurs while multiple pages are imposed on a sheet and the multiple pages are printed. When the multiple printing-error pages are subjected to reprinting, the processor 40 imposes the multiple printing-error pages on a single sheet as a target for reprinting (in other words, creates a print job for reprinting). Then, the processor 40 transmits the print job for reprinting to the printing apparatus 14.

Figure 4:
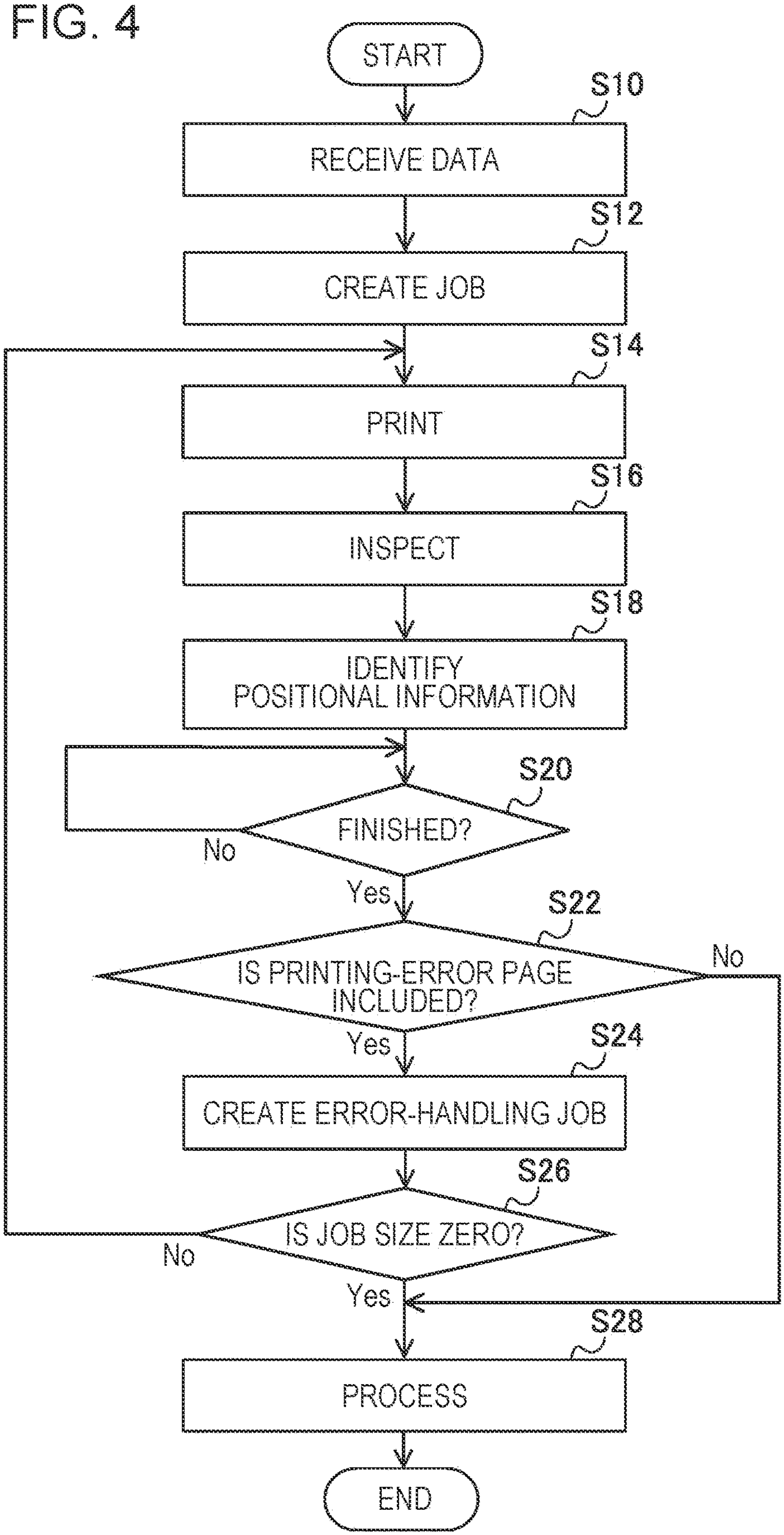
FIG. 4 is a flowchart depicting a process of the information processing system according to the exemplary embodiment.

Referring to FIG. 4, a process according to the exemplary embodiment will further be described below. FIG. 4 is a flowchart depicting a process of the information processing system 10 according to the exemplary embodiment. The exemplary embodiment will be described below on the assumption that the image processing apparatus 12 is configured to perform a process of imposing multiple printing-error pages on a single sheet as a target for reprinting, but the process may be performed by another apparatus.

The processor 40 of the image processing apparatus 12 receives image data via the communication device 36 (S10). For example, the processor 40 receives the image data from an external information apparatus, which is not depicted.

The processor 40 creates a print job for printing the received data (S12). A print job represents a piece of data such as an instruction or a command to perform printing and specifically a piece of data such as an instruction or a command to print data obtained by performing imposition by using the received data. As described above, a print job also includes the information representing the correspondence between the information representing a page and the information representing the position at which the page is placed on a sheet. In summary, a print job includes the positional information of each page. The method of imposition is set in advance. Specifically, the method of imposition is determined based on the method of bookbinding to be used to bind multiple printed sheets each of which containing multiple pages. Further, the method of imposition for reprinting is the same as the method of imposition used for printing when the error occurred. Accordingly, the processor 40 is configured to save to the memory device 38, in case reprinting becomes necessary, the information representing the method of imposition used when the imposition is performed.

Next, the processor 40 transmits the created print job to the printing apparatus 14.

The printing apparatus 14 receives the print job and physically prints each page in accordance with the imposition based on the information included in the print job (S14).

Next, the printing apparatus 14 transports the printed sheet to the inspecting apparatus 16.

The inspecting apparatus 16 receives the printed sheet and inspects the printed sheet (S16). Specifically, the inspecting apparatus 16 inspects the printed sheet to determine whether a printing error such as a stain occurred on the printed sheet.

Subsequently, if a printing error is found, the inspecting apparatus 16 identifies the position at which the printing error occurred on the printed sheet (S18).

Next, the inspecting apparatus 16 transmits the information representing the position at which the printing error occurred to the image processing apparatus 12.

The processor 40 determines whether the printing apparatus 14 has finished all the printing and whether the inspecting apparatus 16 has finished all the inspections (S20). If the processor 40 determines that the printing apparatus 14 has finished all the printing and that the inspecting apparatus 16 has finished all the inspections (Yes in S20), the process proceeds to step S22. In contrast, if the processor 40 determines that the printing apparatus 14 has not finished the printing completely or that the inspecting apparatus 16 has not finished the inspections completely (No in S20), the processor 40 repeats the process of determination in step S20. The process of determination is repeated until all the processing with regard to the printing and the inspections is finished. It is determined in step S20 whether all the printing and all the inspections have been finished in the exemplary embodiment by way of non-limiting example. For example, it may be determined whether all the printing by the printing apparatus 14 has been finished when the printed sheets are transported from the printing apparatus 14 to the inspecting apparatus 16.

Subsequently, the processor 40 receives the information representing the position at which a printing error occurred and that is identified by the inspecting apparatus 16. Then, for each sheet, the processor 40 determines whether a printing error occurred, that is, whether the sheet includes a printing-error page (S22). The processor 40 determines whether the sheet includes a printing-error page based on the information received from the inspecting apparatus 16. Specifically, the processor 40 identifies a printing-error page by comparing between the position at which a printing error occurred and the positional information of each page included in the print job created in step S12. If a page on which a printing error occurred is not included (No in S22), the process proceeds to step S28.

In contrast, if a page on which a printing error occurred is included (Yes in S22), the processor 40 identifies one or more pages related to the printing-error page based on the method of imposition, the method of bookbinding, and the information that is received from the inspecting apparatus 16 and that represents the position at which the printing error occurred.

Subsequently, the processor 40 creates a print job for reprinting (referred to as an "error-handling job" below as appropriate) (S24). The processor 40 creates an error-handling job to reprint the page on which a printing error occurred and one or more pages that are related to the printing-error page, both of which were identified. The processor 40 imposes the printing-error page and the one or more pages related to the printing-error page on a single sheet as a target for reprinting at this time. The processor 40 also imposes multiple printing-error pages on a single sheet as a target for reprinting.

Subsequently, the processor 40 determines whether the size of the created error-handling job is zero (S26). If the processor 40 determines that the size of the error-handling job is not zero (No in S26), that is, determines that there is image data to be subjected to reprinting, the processor 40 transmits the error-handling job to the printing apparatus 14, and the process returns to step S14.

In contrast, if the processor 40 determines that the size of the error-handling job is zero (Yes in S26), the processor 40 transports the printed sheet produced by the printing apparatus 14 to the processing apparatus 18.

The processing apparatus 18 receives the printed sheet and cuts the printed sheet based on the method of bookbinding. The processing apparatus 18 also performs processing such as discarding of a printing-error page (that is, post-processing) (S28), and the process ends.

As described above, multiple pages contained in image data are imposed, a printed sheet is produced, and the printed sheet is inspected in the information processing system 10. Subsequently, the printed sheet is processed, but before the printed sheet is processed, imposition, production of a printed sheet, and inspection are repeated until the number of pages requiring reprinting, which is determined in the inspection, becomes zero.

In step S22 in FIG. 4, for each sheet, the processor 40 determines whether a printing error occurred, but the processor 40 may further determine whether a page that requires reprinting is included. If the processor 40 determines that a page that requires reprinting is included in printing-error pages, in which a printing error occurred, the process proceeds to step S24 as in the flowchart depicted in FIG. 4. In contrast, even when a printing error occurs, the position or degree of the error may render reprinting unnecessary. Thus, if the processor 40 determines that a page that requires reprinting is not included in printing-error pages, in which a printing error occurred, the process may proceed to step S28.

Figure 5:
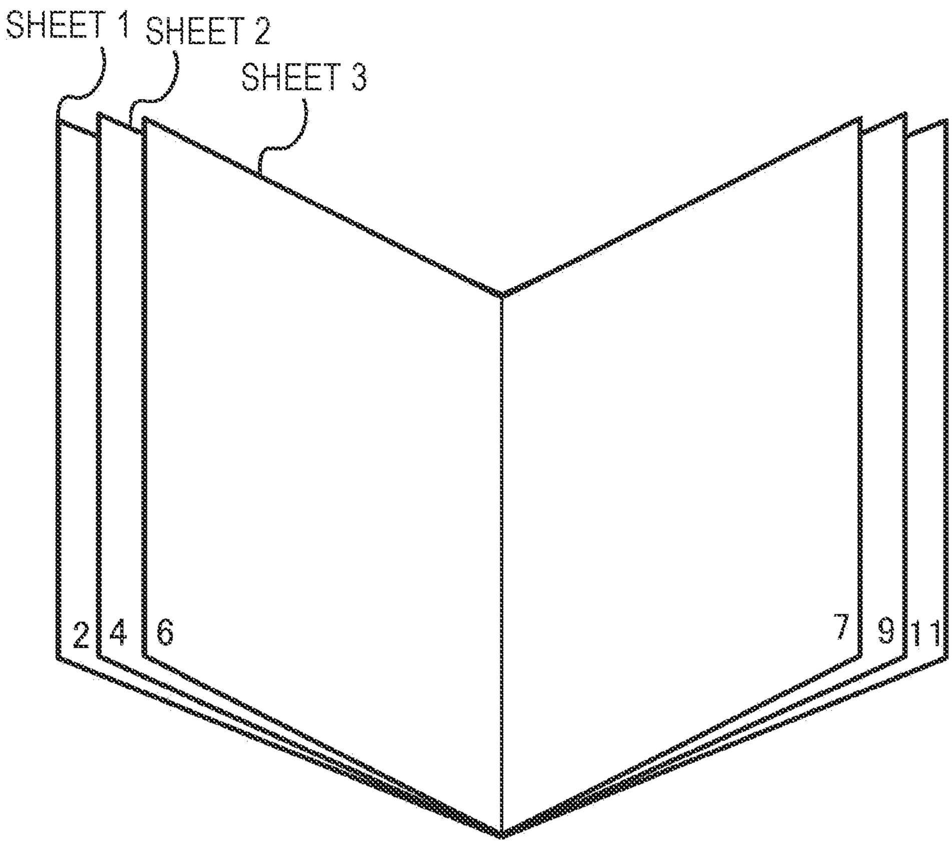
FIG. 5 is an illustration depicting an example of printed matter in the exemplary embodiment.

Next, specific description will be given with regard to the imposition performed in the exemplary embodiment with reference to the drawings. FIG. 5 is an illustration depicting an example of printed matter in the exemplary embodiment. FIG. 5 depicts a booklet that is formed by saddle-stitch bookbinding and that contains 3 sheets (sheet 1, sheet 2, and sheet 3). The first, second, and third sheets are referred to as "sheet 1", "sheet 2", and "sheet 3", respectively. FIG. 5 depicts the front surfaces of sheet 1 to sheet 3.

Figure 6:
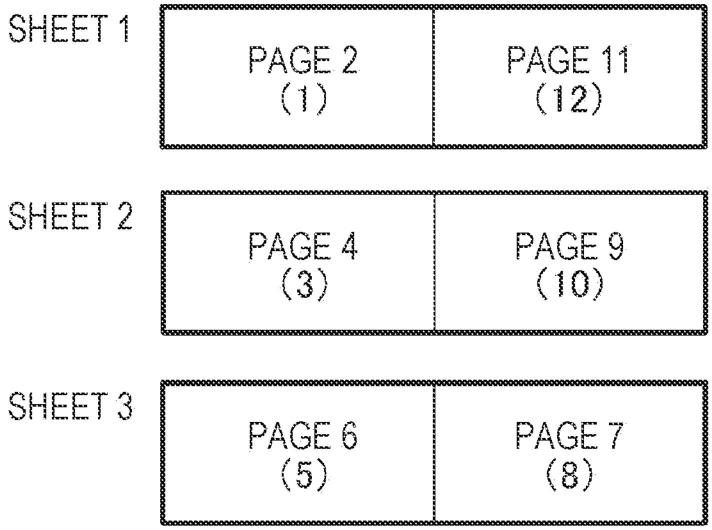
FIG. 6 is an illustration describing the configuration of the printed matter in FIG. 5.

In the present example, it is assumed that 2 pages are imposed on the front surface of a sheet and another 2 pages are imposed on the back surface of the sheet, leading to 4 pages imposed on the sheet, for example, to produce a saddle-stitch book, in which sheets of paper are folded in half and bound together at the center. FIG. 6 depicts the placement of pages for forming the booklet in FIG. 5 when 3 sheets are used (that is, when a total of 12 pages, from page 1 to page 12, are imposed on 3 sheets). FIG. 6 is an illustration describing the configuration of the printed matter in FIG. 5. FIG. 6 depicts page numbers. The numbers attached to the word "PAGE" (such as "2" in "PAGE 2") represent page numbers, and, for example, PAGE 2 indicates that the page is the second page. Page numbers without parentheses represent page numbers on the front surface, and page numbers in parentheses represent page numbers on the back surface. Page 2 is placed on the left side of the front surface of sheet 1, and page 11 is placed on the right side of the front surface in the present example. Page 1 is placed on the opposite side from page 2, and page 12 is placed on the opposite side from page 11. As described above, the "page related to a printing-error page" is a page determined based on the method of bookbinding and the method of imposition. For example, when printed sheets are to be bound into printed matter as a booklet, of the printed sheets to be bound into the printed matter, a page placed on the same printed sheet as a printing-error page is a "page related to a printing-error page". Specifically, if page 11 is a printing-error page in FIG. 6, pages related to the printing-error page are pages 1, 2, and 12, which are placed on sheet 1 of sheets 1, 2, and 3 bound to form the booklet, because pages 1, 2, and 12 are placed on the same sheet, sheet 1, as page 11, which is the printing-error page.

Although FIGS. 5 and 6 depict the case of saddle-stitch bookbinding, the relationship between a printing-error page and the related page is similar when other methods of bookbinding are used. In other words, although the combination or the order of the pages imposed on a sheet varies depending on the method of bookbinding, the relationship between a printing-error page and the related page is defined as pages placed on a single sheet, which is one of the sheets to be bound into the final form of printed matter.

Next, a specific example will be described with regard to the printed matter in the exemplary embodiment with reference to FIGS. 7 to 10.

Figure 7:
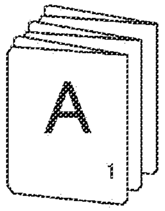
FIG. 7 is an illustration depicting an example of page placement in a print job in the exemplary embodiment.

FIG. 7 is an illustration depicting an example of page placement specified in a print job in the exemplary embodiment. FIG. 7 depicts a booklet A formed with side-stitch bookbinding and a print job 100, the side-stitch bookbinding being a method of bookbinding in which sheets are bound at the edge at several positions. The print job 100 is a piece of data that serves as a basis to produce the final printed matter, the booklet A. The print job 100 contains the result of imposing pages on the front surface and on the back surface in the data.

Figure 8:
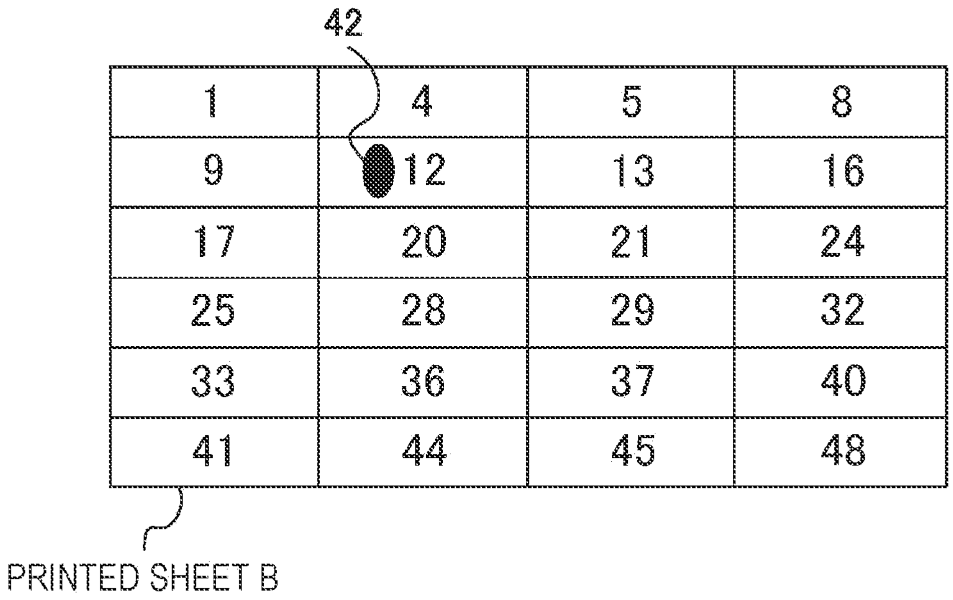
FIG. 8 is Example 1 of a printed sheet obtained when the print job depicted in FIG. 7 is performed.

FIG. 8 depicts Example 1 of a printed sheet obtained when the print job 100 in FIG. 7 is performed. Specifically, FIG. 8 depicts the front surface of a printed sheet B. A total of 24 pages, which are pages, 1, 4, . . . , 45, and 48, are imposed and printed on the front surface of the printed sheet B. A total of 24 pages, which are pages, 2, 3, . . . , 46, and 47, are imposed and printed on the back surface of the printed sheet B although these pages are not depicted in FIG. 8. As depicted in FIG. 8, there is a stain 42 on page 12 on the printed sheet B.

Figure 9:
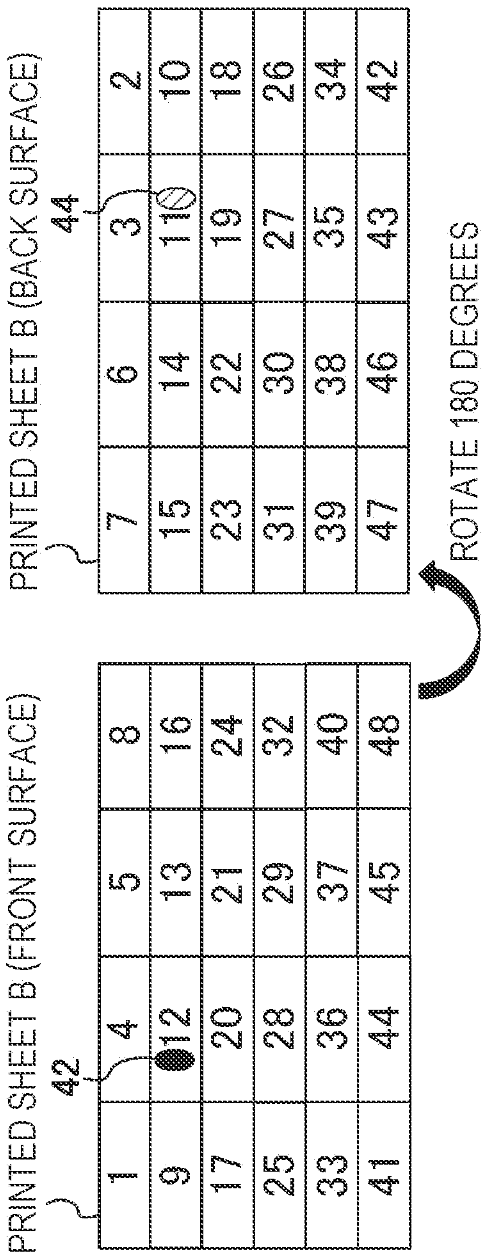
FIG. 9 is an illustration depicting the front surface and the back surface of the printed sheet depicted in FIG. 8.

Next, the printed sheet B depicted in FIG. 8 will further be described with reference to FIGS. 9 and 10. FIG. 9 is an illustration depicting the front surface and the back surface of the printed sheet B depicted in FIG. 8. FIG. 9 depicts, as the front surface of the printed sheet B, the surface on which a total of 24 pages, which are pages, 1, 4, 5, 8, . . . , 41, 44, 45, and 48, are imposed. FIG. 9 also depicts, as the back surface of the printed sheet B, the surface on which a total of 24 pages, which are pages, 7, 6, 3, 2, . . . , 47, 46, 43, and 42, are imposed. The back surface of the printed sheet B is depicted as the image obtained by rotating the printed sheet B by 180 degrees (that is, by flipping the printed sheet B.)

As depicted in FIG. 9, there is the stain 42 on page 12 on the front surface of the printed sheet B. The stain 42 on page 12 is the same as the stain 42 depicted in FIG. 8 and is assumed to be a mark caused by a splash of toner. Description will be given below on the assumption that a stain is caused by a splash of toner. When the front surface is splashed with toner, the stain sometimes can be seen through from the back. Thus, in FIG. 9, how the stain 42 is seen from the back is represented as a stain 44 on page 11, which is the back surface, to indicate that page 11 is imposed as the page placed on the opposite side from page 12.

Figure 10:
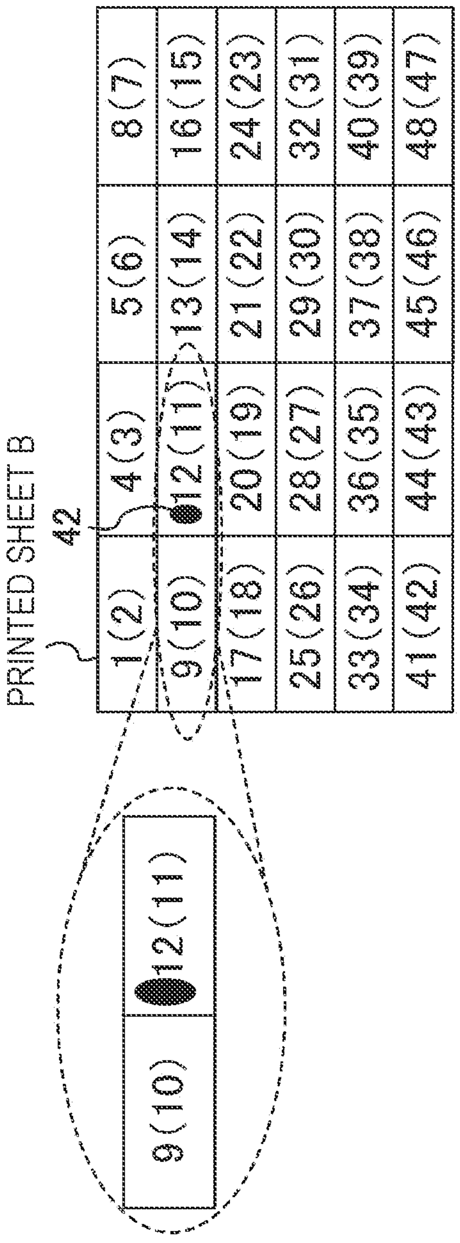
FIG. 10 is an illustration depicting the printed sheet depicted in FIG. 8 in a different manner of presentation.

Next, FIG. 10 is an illustration depicting the printed sheet B depicted in FIG. 8 in a different manner of presentation. The image of the printed sheet B depicted in FIG. 10 is basically the same as the image of the printed sheet B depicted in FIG. 8 and the same as the image of the front surface of the printed sheet B depicted in FIG. 9 except that the back surface is seen through from the front. For the sake of description, the page numbers on the back surface are presented in parentheses as the page numbers seen through from the front in FIG. 10. For example, FIG. 10 indicates that page 2 is imposed as the page placed on the opposite side from page 1 and page 3 is imposed as the page on the opposite side from page 4 on the printed sheet B. More specifically, since the booklet A depicted in FIG. 7 is formed by using the method of side-stitch bookbinding, page 2 is placed on the opposite side from page 1 and page 3 is placed on the opposite side from page 4. Thus, "1 (2)" indicates that page 2 is placed on the opposite side from page 1, and "4 (3)" indicates that page 3 is placed on the opposite side from page 4 in FIG. 10. Also in FIGS. 12, 14, and 16 below, the page numbers on the back surface are presented as the page numbers seen through from the front.

As depicted in FIG. 10, there is the stain 42 on page 12 on the printed sheet B. The stain 42 depicted in FIG. 10 is the same as the stain 42 depicted in FIGS. 8 and 9. Pages 9 (10) and 12 (11) are encircled by a dashed line and enlarged in FIG. 10 to indicate the region containing the stain 42. More detailed description will be given below with regard to the printing-error page and the related pages with reference to FIG. 10.

The print job 100 depicted in FIG. 7 is created and transmitted to the printing apparatus 14 in the information processing system 10. The printing apparatus 14 receives the print job 100 and prints. The printed sheet B is one of the printed sheets obtained at this time. FIG. 10 depicts a portion of the printed sheet B encircled by the imaginary dashed line. Referring to the portion encircled by the dashed line, page 9 is placed on the left side of the front surface, and page 12 is placed on the right side of the front surface. In addition, page 10 is placed on the opposite side from page 9, and page 11 is placed on the opposite side from page 12. Since the printed sheet B is one of the printed sheets to be bound into the side-stitch booklet A, the front surface on which pages 9 and 12 are imposed is folded at the center to make a mountain fold, and the folded portion is stitched to form the edge on the right side. It is assumed that the booklet A is bound on the right side of the front cover and a reader turns pages accordingly. In such a case, page 9 and page 12 are not cut apart by the processing apparatus 18 when post-processing of printing is performed. As described above, a printing-error page and the related pages are defined as the pages placed on a single sheet and, in more detail, are multiple pages that are placed on a single sheet and that are not cut apart when post-processing of printing is performed. Pages related to page 12 on the printed sheet B are pages 9, 10, and 11 in accordance with the above description.

Next, referring to FIGS. 11 to 14, description will be given with regard to the creation of an error-handling job in the information processing system 10 when a printing error occurs.

Figure 11:
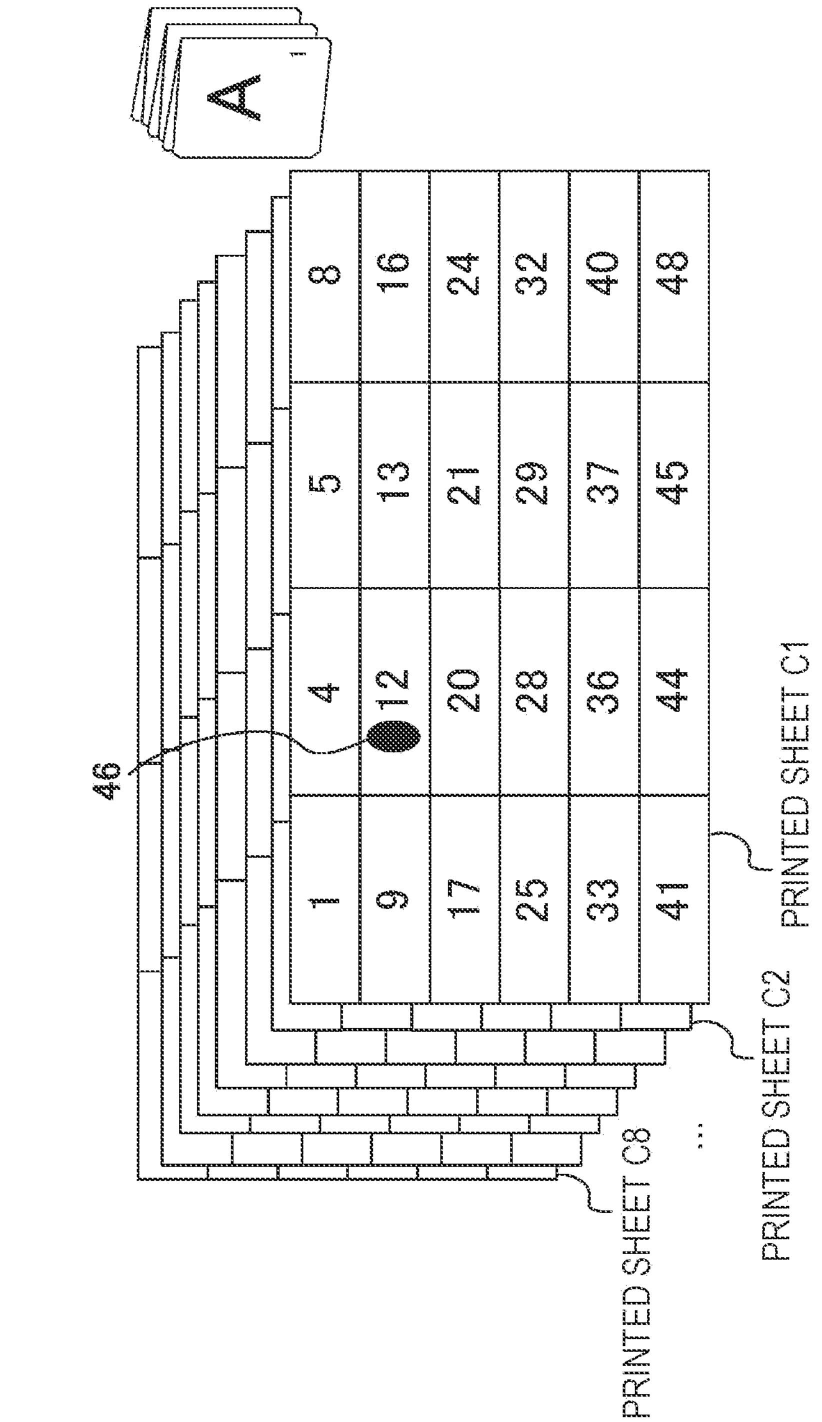
FIG. 11 is Example 2 of printed sheets obtained when the print job depicted in FIG. 7 is performed.

FIG. 11 depicts Example 2 of printed sheets obtained when the print job 100 in FIG. 7 is performed. The printing apparatus 14 is configured to perform printing after the processor 40 creates a print job in the information processing system 10. FIG. 11 depicts the front surface of a printed sheet C1 and portions of printed sheets C2 to C8 after the printing is performed. A total of 24 pages, which are pages 1, 4, . . . , 45, and 48, are imposed and printed on the front surface of the printed sheet C1 depicted in FIG. 11. A total of 24 pages, which are pages 2, 3, . . . , 46, and 47, are imposed and printed on the back surface of the printed sheet C1 although these pages are not depicted in FIG. 11. The same pages are also imposed on the printed sheets C2 to C8 in the same manner as on the printed sheet C1.

As depicted in FIG. 11, there is a stain 46 on page 12 on the printed sheet C1. The printed sheets C2 and after each contain a stain to be treated as a printing error similarly to the printed sheet C1 although such stains are not depicted. For example, there is a stain similar to the stain 46 on page 29 on the printed sheet C2, on page 9 on the printed sheet C5, on pages 14 and 20 on the printed sheet C6, on page 23 on the printed sheet C7, and on page 46 on the printed sheet C8.

After the printing apparatus 14 performs printing, a printed sheet is transported to the inspecting apparatus 16 and inspected by the inspecting apparatus 16 in the information processing system 10. Subsequently, the processor 40 receives the information that is created by the inspecting apparatus 16 and that represents the position at which a printing error occurred. Thereafter, the processor 40 identifies a page on which the printing error occurred and one or more related pages and creates an error-handling job to reprint the identified pages as a target for reprinting.

Since there is the stain 46 on page 12 on the printed sheet C1 depicted in FIG. 11, sheet. Specifically, pages 9 and 12 on the printed sheet C1 are imposed on the front surface, and pages 10 and 11 on the printed sheet C1 are imposed on the back surface. Similarly, as described above, there is a stain on page 29 on the printed sheet C2. Accordingly, page 29 and the related pages 30, 31, and 32 on the printed sheet C2 are imposed on a single sheet. Specifically, pages 29 and 32 on the printed sheet C2 are imposed on the front surface, and pages 30 and 31 on the printed sheet C2 are imposed on the back surface. Imposition with respect to the printed sheet C5 and after is performed in a similar manner. FIG. 12 depicts an error-handling job created at this time. FIG. 12 depicts the error-handling job created when the printed sheets depicted in FIG. 11 are inspected and pages are imposed again.

The processor 40 imposes a printing-error page and pages related to the printing-error page on a single sheet as a target for reprinting when creating an error-handling job. As depicted in FIG. 12, page 12 and the related pages 9, 10, and 11 on the printed sheet C1 are placed in the first row and 2 columns on the left side of the front surface and the back surface displayed on the screen of a print job 102. In addition, page 29 and the related pages 30, 31, and 32 on the printed sheet C2 are placed in the first row and 2 columns on the right side of the front surface and the back surface displayed on the screen of the same print job 102. Page 9 on the printed sheet C5, pages 14 and 20 on the printed sheet C6, page 23 on the printed sheet C7, and page 46 on the printed sheet C8 and pages related to the above are also imposed in a similar manner. Specifically, as depicted in FIG. 12, pages on which a printing error occurred and the related pages, which are both identified, are imposed as a target for reprinting from top left to bottom right on the screen of the print job 102, starting from the pages on the printed sheet C1 depicted in FIG. 11.

Thereafter, the processor 40 transmits an error-handling job created with the imposition as above to the printing apparatus 14. Then, the printing apparatus 14 receives the error-handling job and prints.

Next, description will be given with regard to the creation of another error-handling job when a printing error occurs in the information processing system 10.

Figure 13:
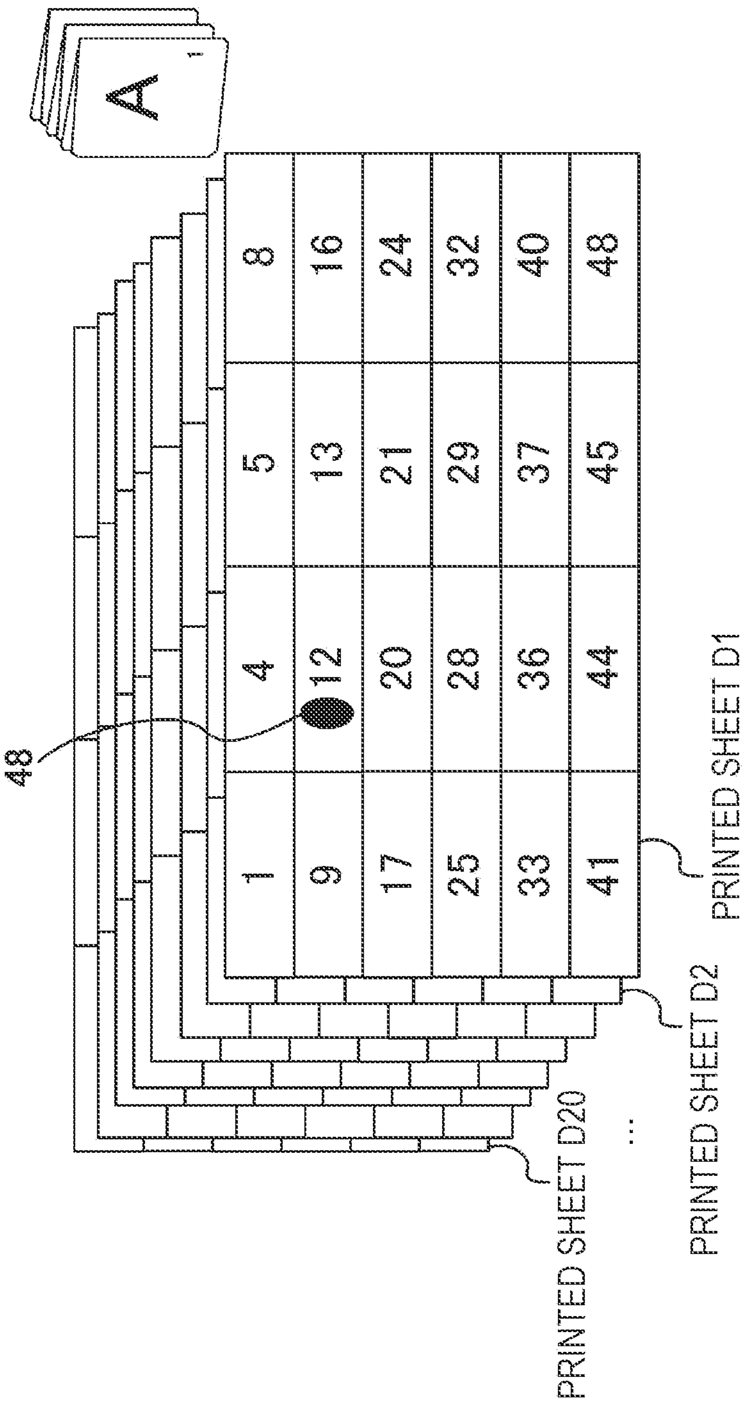
FIG. 13 is Example 3 of printed sheets obtained when the print job depicted in FIG. 7 is performed.

FIG. 13 depicts Example 3 of printed sheets obtained when the print job 100 in FIG. 7 is performed. The printing apparatus 14 performs printing after the processor 40 creates a print job in the information processing system 10. FIG. 13 depicts the front surface of a printed sheet D1 and portions of printed sheets D2 to D20 after the printing is performed. A total of 24 pages, which are pages 1, 4, . . . , 45, and 48, are imposed and printed on the front surface of the printed sheet D1 depicted in FIG. 13. A total of 24 pages, which are pages 2, 3, . . . , 46, and 47, are imposed and printed on the back surface of the printed sheet D1 although these pages are not depicted in FIG. 13. The same pages are also imposed on the printed sheets D2 to D20 in the same manner as on the printed sheet D1.

As depicted in FIG. 13, there is a stain 48 on page 12 on the printed sheet D1. The printed sheets D2 and after also contain stains to be treated as a printing error similarly to the printed sheet D1 although such stains are not depicted. Stains on the printed sheets D2 to D20 are all located on page 12 similarly to the printed sheet D1. In other words, there is a stain at the position (also referred to as a "region") where page 12 is placed on each of the printed sheets D1 to D20. Description will be given with regard to the creation of an error-handling job when a printing error occurs at the same position on each of the printed sheets in this way.

After the printing apparatus 14 performs printing, a printed sheet is transported to the inspecting apparatus 16 and inspected by the inspecting apparatus 16 in the information processing system 10. Subsequently, the processor 40 receives the information that is created by the inspecting apparatus 16 and that represents the position at which a printing error occurred. Thereafter, the processor 40 identifies a page on which the printing error occurred and one or more related pages and creates an error-handling job to reprint the identified pages as a target for reprinting.

Figure 14:
FIG. 14 is an example of print jobs created when pages are imposed again after the printed sheets depicted in FIG. 13 are inspected.

An error occurs at the same position on each of the printed sheets D1 to D20 when pages are imposed in the present example. The processor 40 identifies a page on which the printing error occurred and the related pages based on the information representing the position at which the printing error occurred and creates an error-handling job, which is a print job 104 depicted in FIG. 14, as a target for reprinting at this time. As depicted in FIG. 14, page 12 and the related pages 9, 10, and 11 on each of the printed sheets D1 to D20 are imposed, and the print job 104 is created. Specifically, since there is the stain 48 on page 12 on the printed sheet D1 depicted in FIG. 13, page 12 and the related pages 9, 10, and 11 on the printed sheet D1 are imposed on a single sheet. More specifically, pages 9 and 12 on the printed sheet D1 are imposed on the front surface, and pages 10 and 11 on the printed sheet D1 are imposed on the back surface. Similarly, there is a stain at the same position on each of the printed sheets D2 to D20 as on the printed sheet D1, that is, at the position where page 12 is placed, although such stains are not depicted in FIG. 13. Accordingly, page 12 and the related pages 9, 10, and 11 on each of the printed sheets D2 to D20 are imposed on a single sheet. Specifically, pages 9 and 12 on the printed sheet D2 to D20 are imposed on the front surface, and pages 10 and 11 on the printed sheet D2 to D20 are imposed on the back surface. More specifically, pages are consecutively imposed starting from the top left region of the print job 104 (that is, pages consecutively occupy the space), pages 9 and 12 are imposed on the front surface, and pages 10 and 11 are imposed on the back surface.

Next, it is assumed that when identifying a page to be subjected to reprinting, the processor 40 determines that an error occurred in the same region on all the printed sheets D1 to D20 when pages were imposed. In such a case, the processor 40 does not impose a page on a specific region. When an error occurs multiple times in the same region on a sheet, the region is likely to have some source of trouble. Accordingly, the processor 40 applies a process of imposing no page to be reprinted on the region when creating an error-handling job. In FIG. 13, the printing error occurs in the region where page 12 is placed on each of the printed sheets D1 to D20. Thus, the processor 40 does not impose a page to be reprinted on the region where page 12 and the related pages 9, 10, and 11 are imposed. A print job 106 depicted in FIG. 14 is an example of a print job with pages being imposed in this way. As depicted in FIG. 14, no page is imposed on the region located in the second row from the top and in the 2 columns from the left edge on the front surface and on the back surface on the screen of the print job 106, and the region is empty.

The above description has been given, as an example, with regard to the case where the printing error occurs in the same region on each of the printed sheets D1 to D20. However, the process of imposing no page to be reprinted on such a region may be applied to other cases. For example, when the number of occurrences of a printing error in the same region is equal to a predetermined threshold or larger, the process of imposing no page to be reprinted on the region may be applied. For example, when, of the printed sheets D1 to D20, the number of printed sheets on which a printing error occurred in the same region becomes equal to a threshold or larger, the processor 40 does not impose a page to be reprinted on the region. Alternatively, if the production of the printed sheets D1 to D20 is counted as an event of printing, the number of events of printing in which a printing error occurs in the same region becomes equal to a threshold or larger, the processor 40 does not impose a page to be reprinted on the region.

In addition, for example, when the number of consecutive occurrences of an error in the same region is equal to a threshold or larger, the processor 40 may impose no page to be reprinted on the region. Further, for example, when the number of occurrences of an error in the same region during a predetermined period is equal to a threshold or larger, the processor 40 may impose no page to be reprinted on the region.

Next, a modification will be described with reference to FIGS. 15 and 16. The process according to the modification is a process to be performed when the sum of the number of multiple printing-error pages and the number of pages related to the multiple printing-error pages becomes equal to a specific number. The specific number represents the number of pages to be imposed on a single sheet.

Figure 15:
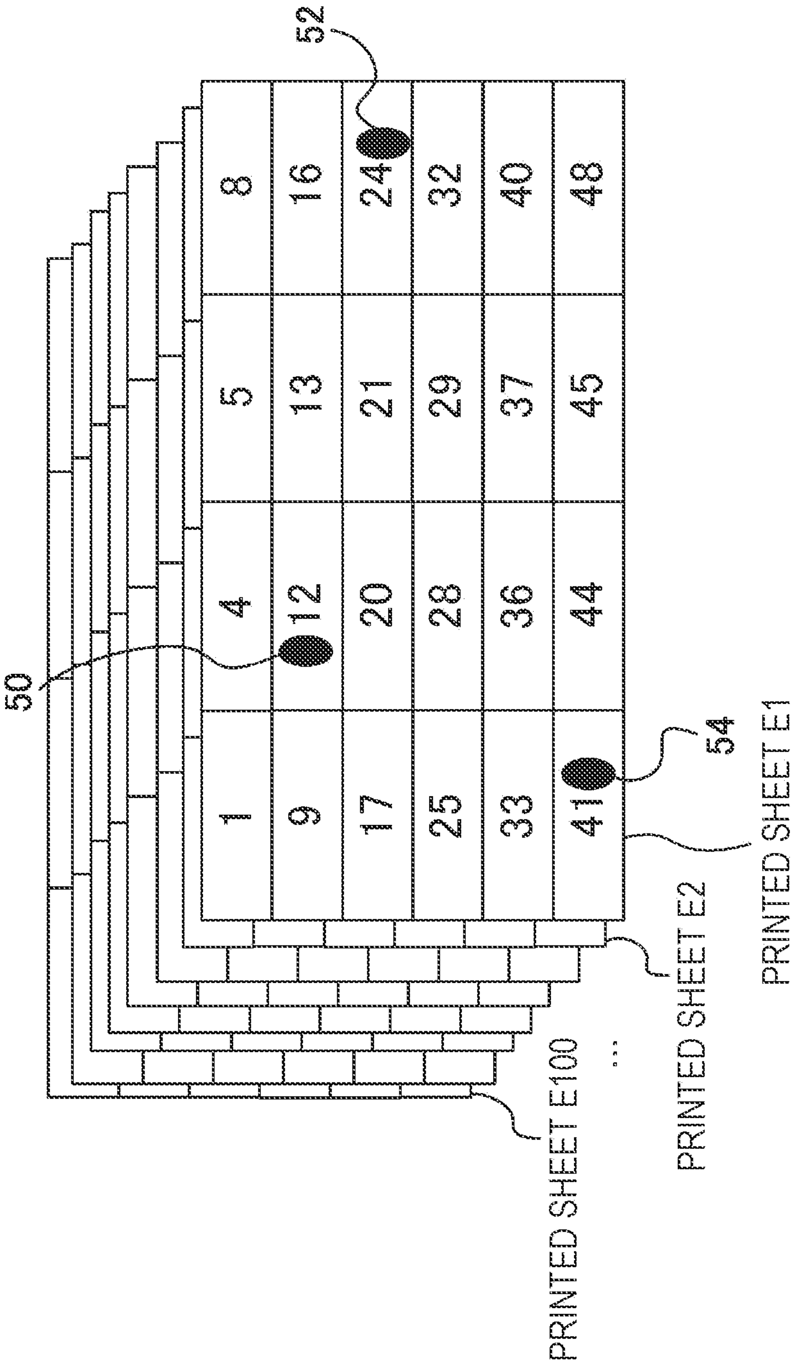
FIG. 15 is Example 4 of printed sheets obtained when the print job depicted in FIG. 7 is performed.
Figure 16:
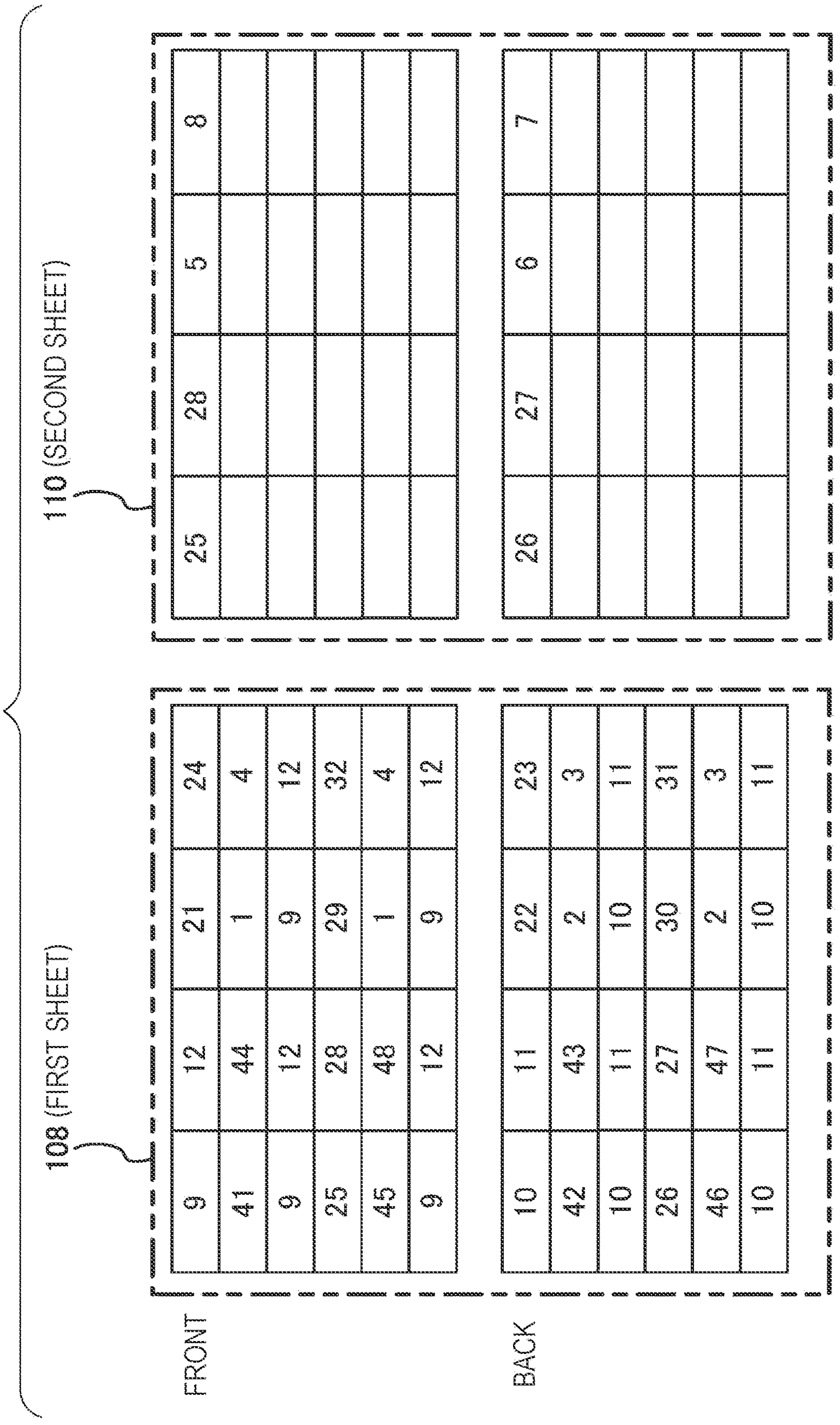
FIG. 16 is an example of print jobs created when pages are imposed again after the printed sheets depicted in FIG. 15 are inspected.

FIG. 15 depicts Example 4 of printed sheets obtained when the print job 100 in FIG. 7 is performed. Further, FIG. 16 depicts an example of print jobs created when pages are imposed again after the printed sheets depicted in FIG. 15 are inspected. The printing apparatus 14 performs printing after the processor 40 creates a print job in the information processing system 10. FIG. 15 depicts the front surface of a printed sheet E1 and portions of printed sheets E2 to E100 after the printing is performed. A total of 24 pages, which are pages 1, 4, . . . , 45, and 48, are imposed and printed on the front surface of the printed sheet E1 depicted in FIG. 15. A total of 24 pages, which are pages 2, 3, . . . , 46, and 47, are imposed and printed on the back surface of the printed sheet E1 although these pages are not depicted in FIG. 15. The same pages are also imposed and printed on the printed sheets E2 to E100 in the same manner as on the printed sheet E1.

As depicted in FIG. 15, there are a stain 50 on page 12, a stain 52 on page 24, and a stain 54 on page 41 on the printed sheet E1. The printed sheets E2 and after also contain stains to be treated as a printing error although such stains are not depicted. For example, there are stains similar to the stain 50 on page 2 on the printed sheet E2, on page 10 on the printed sheet E4, and on pages 11, 28, and 32 on the printed sheet E6. In addition, there are stains on the printed sheet E7 and after, and there are a total of 30 stains on the printed sheets E1 to E100. In summary, since there are 30 printing-error pages and 3 related pages for each of the printing-error pages, the total number of pages to be reprinted is 120. A process performed by the information processing system 10 in such a case will be described.

After the printing apparatus 14 performs printing, a printed sheet is transported to the inspecting apparatus 16 and inspected by the inspecting apparatus 16 in the information processing system 10. Subsequently, the processor 40 receives the information that is created by the inspecting apparatus 16 and that represents the position at which a printing error occurred.

Referring to the flowchart in FIG. 4, step S20 is performed at this time, but the process in step S20 may be omitted in the modification. In other words, the processor 40 receives the information that represents the position at which a printing error occurred from the inspecting apparatus 16 every time an inspection is finished before the inspecting apparatus 16 finishes all the inspections. Then, the processor 40 advances the process to the next step to perform reprinting. In such a case, when imposing again a printing-error page and the related pages that are both identified as a target for reprinting, the processor 40 determines whether the imposed pages have fully occupied the sheet to which the imposed pages are allocated in the data. In more detail, the number of pages to be imposed on a sheet is determined by the method of bookbinding and the method of imposition. FIG. 16 depicts print jobs 108 and 110 while pages are imposed again. As also depicted in FIG. 16, the number of pages to be imposed on the front surface and on the back surface of a single sheet is 48 in total in the present modification. The processor 40 counts the number of pages imposed again while performing the process of imposing pages again. Then, the processor 40 determines whether the number of pages imposed again has reached 48, which is the number of pages to be imposed on a single sheet.

When the processor 40 determines that the number of pages imposed again (that is, the sum of the number of printing-error pages and the number of related pages) has reached the number of pages to be imposed on a single sheet, the processor 40 further advances the process to the next step. In the next step, the processor 40 creates an error-handling job based on the imposed pages obtained when it is determined that the number of pages imposed again has reached the number of pages to be imposed on a single sheet, and the processor 40 transmits the error-handling job to the printing apparatus 14. Specifically, the processor 40 creates the print job 108, which contains the information with regard to how pages are imposed on the first sheet, and transmits the print job 108 to the printing apparatus 14.

More detailed description will be given with regard to the print jobs 108 and 110 depicted in FIG. 16, which are obtained while pages are imposed again. The print job 108 contains the arrangement of the pages to be printed on the first sheet by the printing apparatus 14. The print job 110 contains the information with regard to how pages are imposed on the second sheet. In other words, the print job 110 contains the arrangement of the pages to be printed on the second sheet by the printing apparatus 14. For example, pages are consecutively placed starting from the top left region, and when the sum of the number of the printing-error pages and the number of the related pages reaches 48, the printing-error pages and the related pages fully occupy the first sheet. As depicted in FIG. 16, the sheet to which pages are allocated in the data is fully occupied by the imposed pages in the print job 108. In other words, the number of imposed pages has reached the number of pages to be imposed on a single sheet in the print job 108. The inspecting apparatus 16 has not finished all the inspections at this stage, and not all of the 120 pages to be reprinted have been imposed. This can also be seen by the fact that the print job 110 only contains 8 pages. However, the processor 40 creates and transmits an error-handling job to advance the process to perform reprinting even in such a situation. Specifically, since the number of imposed pages contained in the print job 108 has reached the number of pages to be imposed on a single sheet, the processor 40 transmits the print job 108 to the printing apparatus 14 and causes the printing apparatus 14 to print at this stage. The printing apparatus 14 prints each page on a sheet in accordance with the print job 108. This procedure causes each page contained in the print job 108 (such as page 9) to be imposed on a sheet and printed. Reprinting starts in this way when printing-error pages and the related pages have fully occupied a single sheet before all the inspections finish in the modification.

Although the processor 40 of the image processing apparatus 12 is configured to impose pages in the exemplary embodiment and in the modification, for example, the printing apparatus 14 may impose pages. As described above, the method of imposition for reprinting is the same as the method of imposition used for printing when an error occurred. Accordingly, when the printing apparatus 14 imposes pages, the printing apparatus 14 saves the information representing the method of imposition to the memory possessed by the printing apparatus 14 in case reprinting becomes necessary.

The function of the image processing apparatus 12 described above is achieved, for example, by the cooperation between hardware and software. For example, the processor provides the functions of each device by reading and executing programs stored in the memory of each device. Programs are saved to the memory by using a recording medium such as a compact disc (CD) or a digital versatile disc (DVD), or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing apparatus comprising:

a processor configured to impose a group of pages on a single sheet as a target for reprinting and perform reprinting, the group of pages being referred to as printing-error pages, each of the pages having been printed with a printing error that occurred while a plurality of pages imposed on one or more sheets were printed.

(((2)))

The image processing apparatus according to (((1))), wherein a method of imposition for reprinting is the same as a method of imposition for printing used when the printing error occurred.

(((3)))

The image processing apparatus according to (((1))) or (((2))), wherein the method of imposition for printing is determined based on a method of bookbinding to be used to bind a plurality of printed sheets obtained by printing the plurality of pages.

(((4)))

The image processing apparatus according to any one of (((1))) to (((3))), wherein the processor is configured to:

impose the printing-error pages and pages related to the printing-error pages on a single sheet as a target for reprinting.

(((5)))

The image processing apparatus according to (((4))), wherein the pages related to the printing-error pages are determined based on the method of imposition for printing.

(((6)))

The image processing apparatus according to (((5))), wherein one or more pages related to one of the printing-error pages are defined as one or more pages placed on the same sheet as the one of the printing-error pages, the sheet being one of a plurality of printed sheets that are obtained by printing the plurality of pages and that are bound to produce a book.

(((7)))

The image processing apparatus according to (((6))), wherein the number of pages to be imposed on a single sheet is determined, and wherein the processor is configured to:

impose the printing-error pages and the pages related to the printing-error pages on a single sheet and start reprinting when a sum of the number of the printing-error pages and the number of the pages related to the printing-error pages becomes equal to the number of pages to be imposed on a single sheet.

(((8)))

The image processing apparatus according to any one of (((1))) to (((7))), wherein the processor is configured to:

after the number of occurrences of a printing error in a region on which pages are imposed on a sheet becomes equal to a threshold or larger, impose no page on the region as a target for reprinting.

(((9)))

A program causing a computer to execute a process, the process comprising:

imposing a group of pages on a single sheet as a target for reprinting and performing reprinting, the group of pages being referred to as printing-error pages, each of the pages having been printed with a printing error that occurred while a plurality of pages imposed on one or more sheets were printed.

What is claimed is:

1. An image processing apparatus comprising:

a processor configured to:

perform an inspection for a single sheet on which a plurality of pages are imposed, receive a position at which an error occurred on the single sheet, determine whether the error occurred on each of the plurality of the pages based on the position at which the error occurred on the single sheet and a position of each of the plurality of the pages on the single sheet, and impose a group of pages on a single sheet as a target for reprinting and perform reprinting, each of the group of the pages being determined to have the error.

2. The image processing apparatus according to claim 1, wherein a method of imposition for reprinting is the same as a method of imposition for printing used when the error occurred.

3. The image processing apparatus according to claim 2, wherein the method of imposition for printing is determined based on a method of bookbinding to be used to bind a plurality of printed sheets obtained by printing the plurality of pages.

4. The image processing apparatus according to claim 3, wherein the processor is configured to:

after the number of occurrences of a printing error in a region on which pages are imposed on a sheet becomes equal to a threshold or larger, impose no page on the region as a target for reprinting.

5. The image processing apparatus according to claim 2, wherein the processor is configured to:

after the number of occurrences of a printing error in a region on which pages are imposed on a sheet becomes equal to a threshold or larger, impose no page on the region as a target for reprinting.

6. The image processing apparatus according to claim 1, wherein the processor is configured to:

impose the group of pages, and pages related to the group of pages on a single sheet as a target for reprinting.

7. The image processing apparatus according to claim 6, wherein the pages related to the group of pages are determined based on the method of imposition for printing.

8. The image processing apparatus according to claim 7, wherein one or more pages related to one of the group of pages are defined as one or more pages placed on the same sheet as the one of the group of pages, the sheet being one of a plurality of printed sheets that are obtained by printing the plurality of pages and that are bound to produce a book.

9. The image processing apparatus according to claim 8, wherein the number of pages to be imposed on a single sheet is determined, and wherein the processor is configured to:

impose the group of pages and the pages related to the group of pages on a single sheet and start reprinting when a sum of the number of the group of pages and the number of the pages related to the group of pages becomes equal to the number of pages to be imposed on a single sheet.

10. The image processing apparatus according to claim 9, wherein the processor is configured to:

after the number of occurrences of a printing error in a region on which pages are imposed on a sheet becomes equal to a threshold or larger, impose no page on the region as a target for reprinting.

11. The image processing apparatus according to claim 6, wherein the processor is configured to:

after the number of occurrences of a printing error in a region on which pages are imposed on a sheet becomes equal to a threshold or larger, impose no page on the region as a target for reprinting.

12. The image processing apparatus according to claim 7, wherein the processor is configured to:

after the number of occurrences of a printing error in a region on which pages are imposed on a sheet becomes equal to a threshold or larger, impose no page on the region as a target for reprinting.

13. The image processing apparatus according to claim 8, wherein the processor is configured to:

after the number of occurrences of a printing error in a region on which pages are imposed on a sheet becomes equal to a threshold or larger, impose no page on the region as a target for reprinting.

14. The image processing apparatus according to claim 1, wherein the processor is configured to:

after the number of occurrences of a printing error in a region on which pages are imposed on a sheet becomes equal to a threshold or larger, impose no page on the region as a target for reprinting.

15. A non-transitory computer readable medium storing a program causing a computer to execute a process, the process comprising:

performing an inspection for a single sheet on which a plurality of pages are imposed, receiving a position at which an error occurred on the single sheet, determining whether the error occurred on each of the plurality of the pages based on the position at which the error occurred on the single sheet and a position of each of the plurality of the pages on the single sheet, and imposing a group of pages on a single sheet as a target for reprinting and performing reprinting, each of the group of the pages being determined to have the error.

16. An image processing method comprising:

performing an inspection for a single sheet on which a plurality of pages are imposed, receiving a position at which an error occurred on the single sheet, determining whether the error occurred on each of the plurality of the pages based on the position at which the error occurred on the single sheet and a position of each of the plurality of the pages on the single sheet, and imposing a group of pages on a single sheet as a target for reprinting and performing reprinting, each of the group of the pages being determined to have the error.

* * * * *